(12) United States Patent
Aten et al.

(10) Patent No.: US 8,109,466 B2
(45) Date of Patent: Feb. 7, 2012

(54) THRUST REVERSER CASCADE ASSEMBLY AND AFT CASCADE RING WITH FLOW DEFLECTOR PORTION

(75) Inventors: Michael Ray Aten, San Diego, CA (US); Sara Christine Crawford, Jamul, CA (US)

(73) Assignee: Rohr, Inc., Chula Vista, CA (US)

( * ) Notice: Subject to any disclaimer, the term of this patent is extended or adjusted under 35 U.S.C. 154(b) by 883 days.

(21) Appl. No.: 12/144,368

(22) Filed: Jun. 23, 2008

(65) Prior Publication Data

US 2009/0314887 A1 Dec. 24, 2009

(51) Int. Cl.
*F02K 1/54* (2006.01)
(52) U.S. Cl. ............... 244/110 B; 239/265.31; 60/226.2
(58) Field of Classification Search ............. 244/110 B; 239/265.25–265.31; 60/226.2
See application file for complete search history.

(56) References Cited

U.S. PATENT DOCUMENTS

| | | | |
|---|---|---|---|
| 3,500,644 A * | 3/1970 | Hom et al. | |
| 3,500,645 A * | 3/1970 | Hom et al. | |
| 3,500,646 A * | 3/1970 | Hom et al. | |
| 3,503,211 A * | 3/1970 | Medawar et al. | |
| 3,511,055 A * | 5/1970 | Timms | |
| 3,981,451 A * | 9/1976 | Prior et al. | |
| 4,005,822 A * | 2/1977 | Timms | |
| 4,026,105 A * | 5/1977 | James | 60/226.2 |
| 4,185,798 A * | 1/1980 | Dickenson | |
| 4,340,178 A * | 7/1982 | Lawson | |
| 4,545,199 A * | 10/1985 | Sankey et al. | |
| 4,564,160 A * | 1/1986 | Vermilye | 244/110 B |
| 4,778,110 A * | 10/1988 | Sankey et al. | |
| 4,922,713 A * | 5/1990 | Barbarin et al. | |
| 4,998,409 A * | 3/1991 | Mutch | |
| 5,228,641 A * | 7/1993 | Remlaoui | |
| 5,239,822 A * | 8/1993 | Buchacher | |
| 5,309,711 A * | 5/1994 | Matthias | |
| 5,655,360 A * | 8/1997 | Butler | |
| 5,778,659 A * | 7/1998 | Duesler et al. | |
| 5,806,302 A * | 9/1998 | Cariola et al. | |
| 6,082,096 A * | 7/2000 | Vauchel | 239/265.31 |
| 6,151,883 A * | 11/2000 | Hatrick et al. | 244/110 B |

(Continued)

FOREIGN PATENT DOCUMENTS

EP 1 457 659 A2 9/2004

(Continued)

OTHER PUBLICATIONS

European Patent Office, Examination Report for EP 09007905.4, Apr. 19, 2011.

(Continued)

*Primary Examiner* — Galen Barefoot
(74) *Attorney, Agent, or Firm* — Womble Carlyle Sandridge & Rice, LLP

(57) ABSTRACT

An aircraft engine thrust reverser cascade assembly includes a plurality of circumferentially spaced cascade segments, each cascade segment including a plurality of spaced vanes including an aft-most vane, and an aft end. The cascade assembly also includes an aft cascade ring removably attached to the aft ends of the cascade segments. The aft cascade ring includes a deflector portion that at least partially extends forward of the aft ends of the cascade segments. The deflector portion is configured to at least partially redirect at least a portion of a volume of air as the air outwardly passes between the aft-most vanes and the aft ends of the cascade segments.

20 Claims, 7 Drawing Sheets

U.S. PATENT DOCUMENTS

| | | | |
|---|---|---|---|
| 6,170,254 B1 | 1/2001 | Cariola | |
| 6,474,059 B2 * | 11/2002 | Stretton | 239/265.31 |
| 6,546,715 B1 | 4/2003 | Blevins et al. | |
| 6,568,172 B2 * | 5/2003 | Jannetta et al. | 244/110 B |
| 6,584,763 B2 | 7/2003 | Lymons et al. | |
| 6,824,101 B2 | 11/2004 | Sternberger et al. | |
| 7,124,981 B2 * | 10/2006 | Parham | 244/110 B |
| 7,334,395 B2 * | 2/2008 | Tweedie et al. | 244/110 B |
| 2002/0124550 A1 | 9/2002 | Stretton | |
| 2004/0159741 A1 | 8/2004 | Sternberger et al. | |
| 2006/0277895 A1 | 12/2006 | Thornock et al. | |

FOREIGN PATENT DOCUMENTS

| | | |
|---|---|---|
| EP | 1 462 642 A1 | 9/2004 |
| GB | 925 010 A | 5/1963 |

OTHER PUBLICATIONS

European Search Report (EP Pub. No. EP 2 138 697) dated: Mar. 30, 2011, pp. 1-3.

Chinese Office Action (Chinese Appln. No. 200910150313.4) dated: Mar. 3, 2011, (including English translation), pp. 1-10.

\* cited by examiner

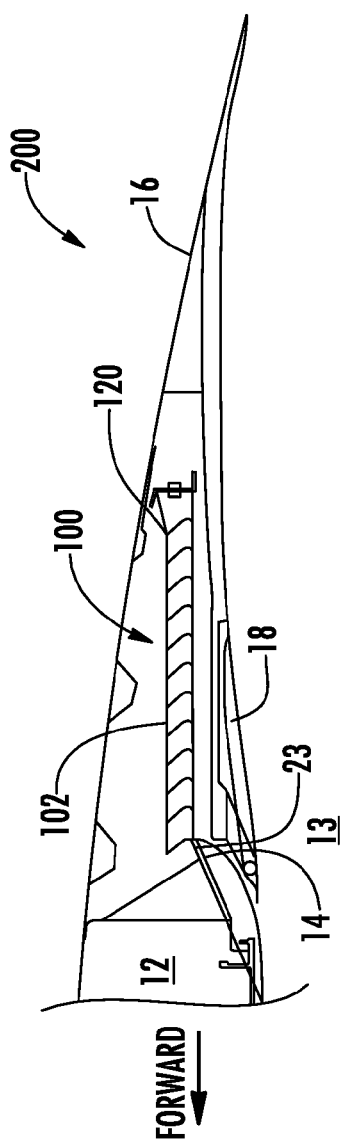
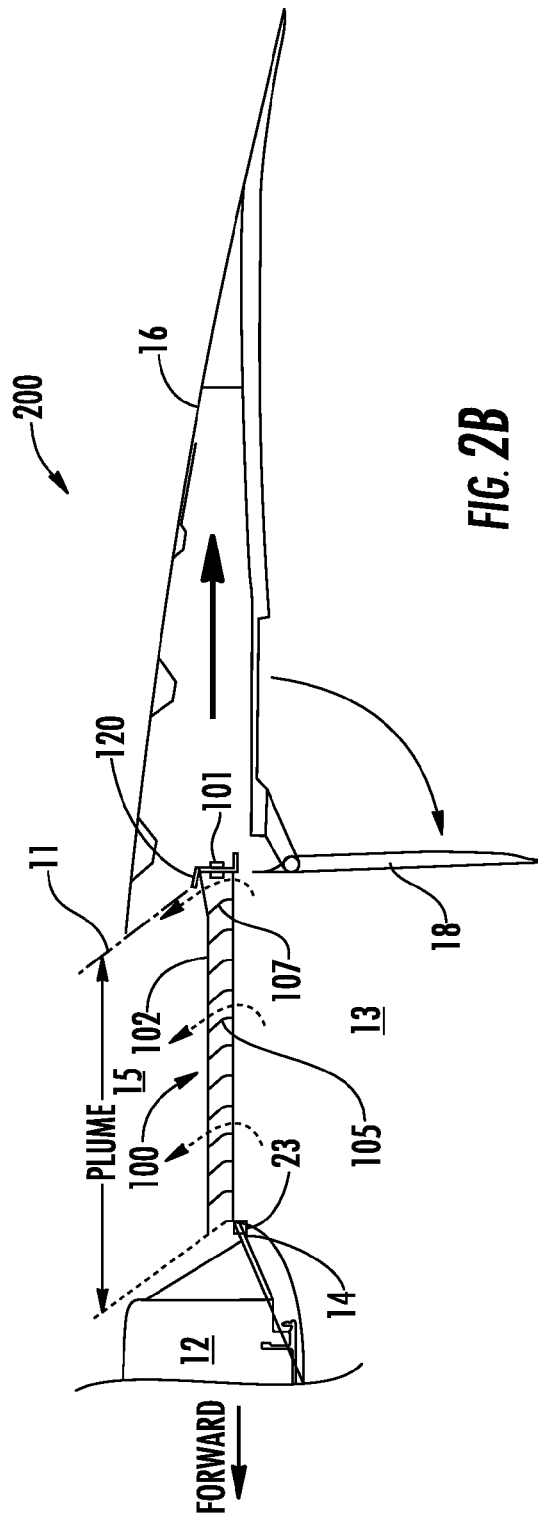
FIG. 2A
FIG. 2B

THRUST REVERSER CASCADE ASSEMBLY AND AFT CASCADE RING WITH FLOW DEFLECTOR PORTION

FIELD OF THE INVENTION

The invention generally relates to thrust reversers for turbofan aircraft engines, and more particularly relates to an aft cascade ring that connects the aft ends of a plurality of thrust reverser cascade segments, and includes an integral flow deflector that turns at least some of a turbofan engine's annular fan flow when the associated thrust reverser is deployed.

BACKGROUND

Modern turbofan aircraft engines include thrust reverses that selectively reverse the direction of an engine's annular fan flow for use in decelerating an aircraft after touchdown. One type of thrust reverser for a turbofan engine includes a cascade array mounted in a selectively closable outlet opening in an engine's fan air duct. The cascade array includes a plurality of spaced, cascading vanes that redirect fan flow in the engine's annular fan duct from an aftward direction to an outward and forward direction when the thrust reverser is deployed. Examples of various cascade-type thrust reversers are described and shown in, for example, U.S. Pat. Nos. 5,309,711; 6,170,254; and 6,546,715; all assigned to Rohr, Inc.

Portions of a typical cascade-type thrust reverser 10 for a turbofan aircraft engine 5 are shown in FIGS. 1A-1E. As shown in FIG. 1A, a turbofan engine 5 can include a cascade-type thrust reverser 10. The thrust reverser 10 includes a translating sleeve 16 that forms an aft portion of a nacelle surrounding the engine's annular fan duct 13. The translating sleeve 16 is movably connected to the aft end of a stationary portion 12 of the nacelle. For normal aftward fan flow through the engine's fan duct 13, the translating sleeve 16 is positioned immediately behind the stationary portion 12 of the nacelle (not shown in the figures), and confines the fan flow within the fan duct 13. As shown in FIGS. 1A-1C, when the thrust reverser 10 is deployed, the translating sleeve 16 is moved aftward and away from the aft end of the stationary portion 12 of the nacelle, thus providing an outlet opening 15 between the stationary portion 12 and the forward end of the translating sleeve 16. The outlet opening 15 typically extends on either side of a supporting engine pylon 7, and typically extends around a substantial portion of the circumference of the engine 5. For example, in the example shown in FIGS. 1A and 1B, the opening 15 extends around a substantial portion of both the port and starboard sides of the engine 5. The outlet opening 15 permits fan flow to be discharged from the engine's annular fan duct 13 in order to provide reverse thrust for slowing a landed aircraft. As shown in FIG. 1C, a plurality of blocker doors 18 proximate to the forward end of the translating sleeve 16 are deployed to block aftward fan flow within the annular fan duct 13, and to force the fan flow to exit the engine through the outlet opening 15.

As shown in FIGS. 1A and 1B, a cascade assembly 20 is disposed within the exit opening 15. The cascade assembly 20 typically includes a plurality of circumferentially arranged cascade segments 28. The forward ends of the adjacent segments 28 are removably attached to the aft end of the stationary portion 12 of the nacelle with removable mechanical fasteners 23 of a type known in the art. As shown in FIG. 1C, the cascade segments 28 include pluralities of spaced vanes 25 configured to turn the exiting fan flow to an at least partially forward direction in order to provide reverse thrust. The vanes 25 are typically supported between a plurality of longitudinal support members 26. The aft ends of the cascade segments 28 are interconnected by an aft cascade ring 30. The aft cascade ring 30 ties the cascade segments 28 together, and stiffens the cascade assembly 20 against outward deflection. As shown in FIG. 1D, the aft end of each cascade segment can include an end flange 29, and can be connected to the aft cascade ring 30 by a plurality of removable fasteners 21 of a type known in the art.

In the embodiment shown in FIGS. 1C and 1D, the aft cascade ring 30 includes an outer portion 36 and an inner portion 34 that are connected to opposed ends of a body portion 32 at right angles. The substantially Z-shaped cross-section of the cascade ring 30 provides the ring with substantial stiffness against bending and twisting, though all portions 32, 34 and 36 of the ring are relatively thin. As also shown in FIGS. 1C and 1D, an aft vane 27 in each cascade segment 28 defines the rearmost extent 11 of the exhaust plume as the redirected fan flow exits the outlet opening 15. As shown in FIG. 1D, the aft vane 27 is positioned forward of the aft cascade ring 30, and the aft cascade ring 30 is positioned behind the rearmost extent 11 of the exhaust plume by a distance "a". Accordingly, the aft cascade ring 30 has no substantial or direct effect on turning the exiting fan flow as the flow passes through the exit opening 15.

Another configuration of a known aft cascade ring 60 is shown in FIG. 1E. In this arrangement, each cascade segment 58 includes a rearwardly extending flange 52 for connection to a forward extending flange 63 on the aft cascade ring 60 with a plurality of removable fasteners 21. The aft cascade ring 60 includes a body portion 69 and opposed inner and outer portions 67, 65. Again, the cross-sectional shape of the ring 60 provides substantial stiffness, though the individual portions 63, 65, 67 and 69 of the ring 60 are relatively thin. As shown in FIG. 1E, the aft-most vane 57 is positioned forward of the ring 60, and the ring 60 is positioned behind the rear-most extent 11 of the exhaust plume by a substantial distance "b". Accordingly, like the aft cascade ring 30 described above, the ring 60 has no substantial or direct effect on turning the exiting fan flow as the flow passes through the exit opening 15.

Though the aft cascade rings 30, 60 described above can be used to securely and rigidly connect the aft ends of thrust reverser cascade segments, they have some shortcomings. First, as discussed above, the aft cascade rings 30, 60 play no substantial or direct role in turning exiting fan flow, and thus are ancillary to the primary function of their cascade assemblies 20, 50. Second, because the aft cascade rings 30, 60 are positioned aft of the aft-most cascade vanes 27, 57 and add to the overall length of the cascade assemblies 20, 50, the aft cascade rings 30, 60 add extra weight to the cascades 20, 50 without directly contributing to their air-turning function. Accordingly, at least for these reasons, there is a need for an improved thrust reverser cascade assembly with an improved aft cascade ring that directly contributes to the air-turning function of the cascade assembly, and effectively reduces the overall length and weight of the cascade assembly.

SUMMARY

In one embodiment, an aircraft engine thrust reverser cascade assembly includes a plurality of circumferentially spaced cascade segments, each cascade segment including a plurality of spaced vanes including an aft-most vane, and an aft end. The cascade assembly can further include an aft cascade ring that is removably attached to the aft ends of the cascade segments, and includes a deflector portion that at least partially extends forward of the aft ends of the cascade segments. The deflector portion can be configured to at least partially redirect at least a portion of a volume of air as the air outwardly passes between the aft-most vanes and the aft ends of the cascade segments.

In another embodiment, an aft cascade ring for an aircraft engine thrust reverser cascade assembly having a plurality of cascade segments can include a body portion having an outer edge and an inner edge. The body portion can be configured for removable attachment to aft ends of the cascade segments. The aft cascade ring can also include a deflector portion that is connected to the outer edge and extends forward of the body portion. The deflector portion can be configured to redirect at least some reverse thrust exhaust air passing through the cascade segment forward of the aft end of the cascade segment. The deflector portion can be non-orthogonal with the body portion.

These and other aspects and features of the invention will be understood from a reading of the following detailed description, together with the drawings.

BRIEF DESCRIPTION OF THE DRAWINGS

FIG. 2A is a partial cross-sectional view of a thrust reverser in a stowed configuration that includes one embodiment of a cascade assembly and aft cascade ring according to the invention.

FIG. 2B is a partial cross-sectional view of the thrust reverser shown in FIG. 2A, with the translating sleeve in a deployed position.

DETAILED DESCRIPTION

Figure 1A:
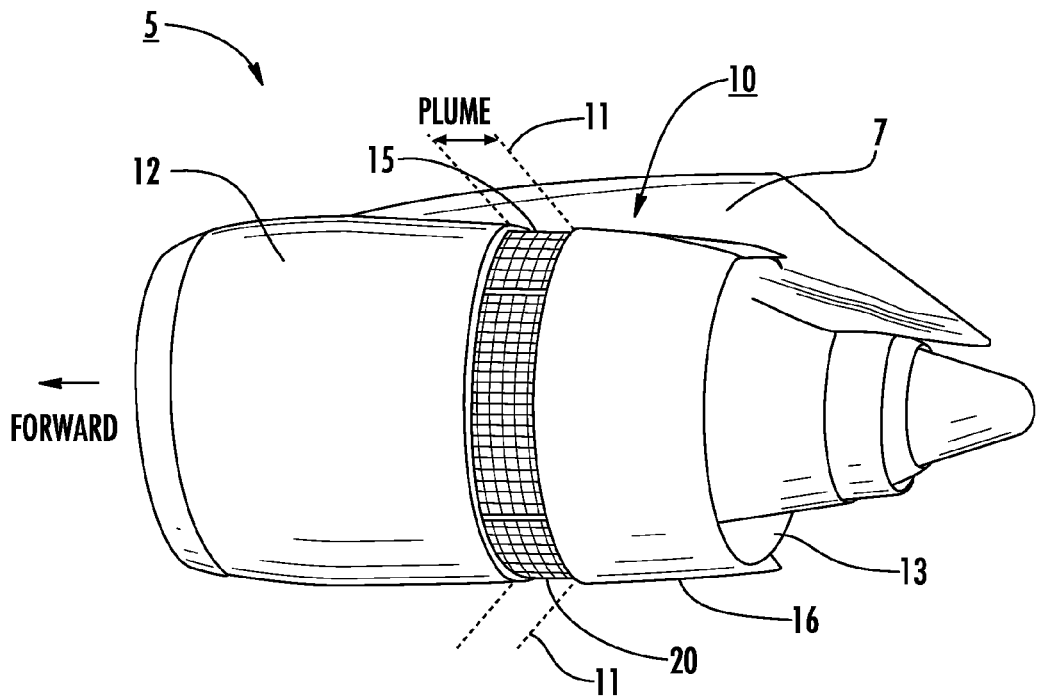
FIG. 1A is a perspective view of a prior art turbofan aircraft engine with a deployed cascade-type thrust reverser.
Figure 1B:
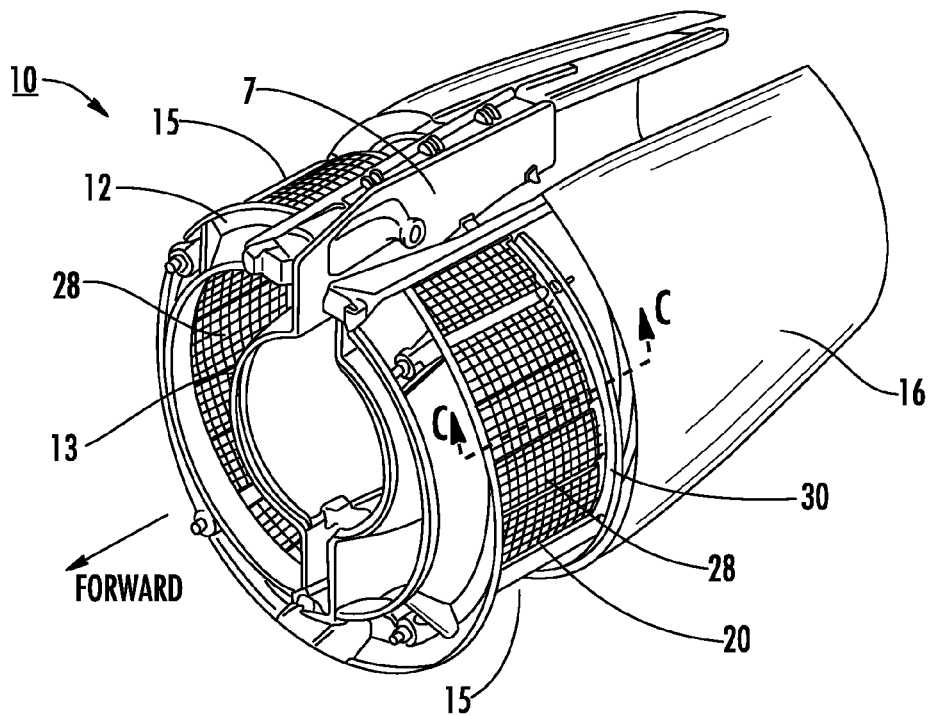
FIG. 1B is a perspective view of the prior art cascade-type thrust reverser shown in FIG. 1A.
Figure 1C:
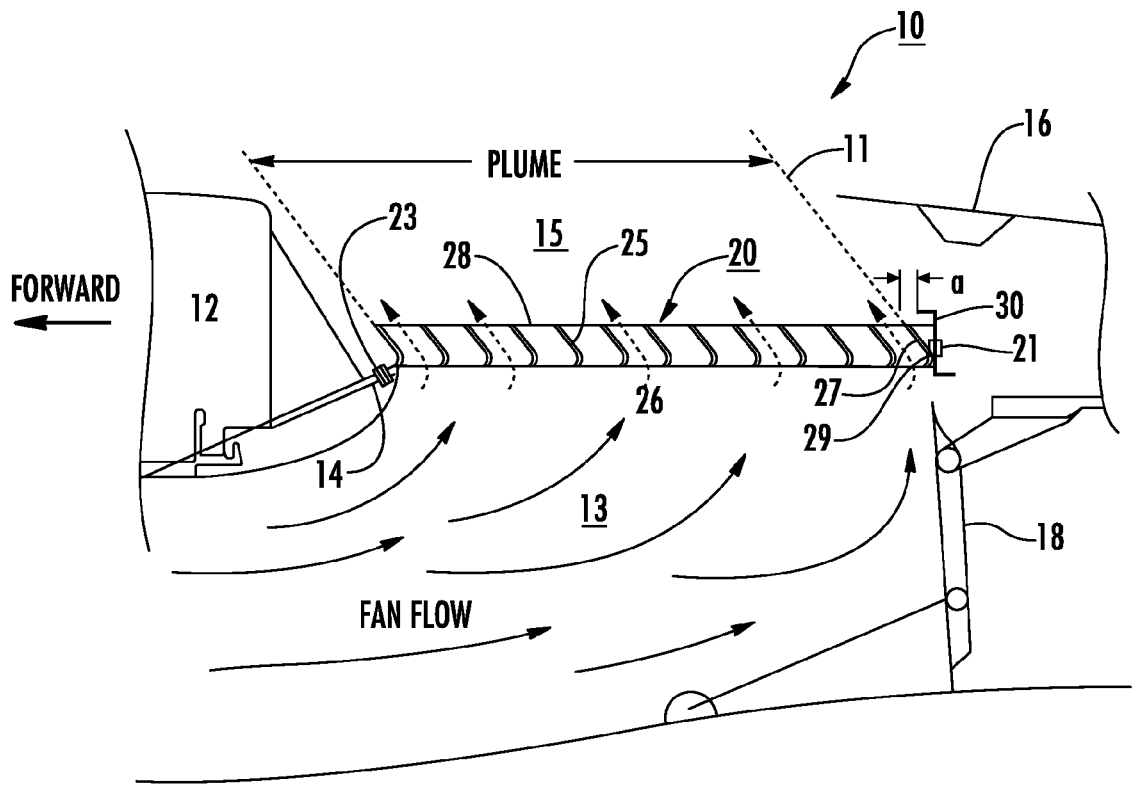
FIG. 1C is a partial cross-sectional view of the prior art cascade-type thrust reverser shown in FIGS. 1A and 1B taken along line C-C in FIG. 1B.
Figure 1D:
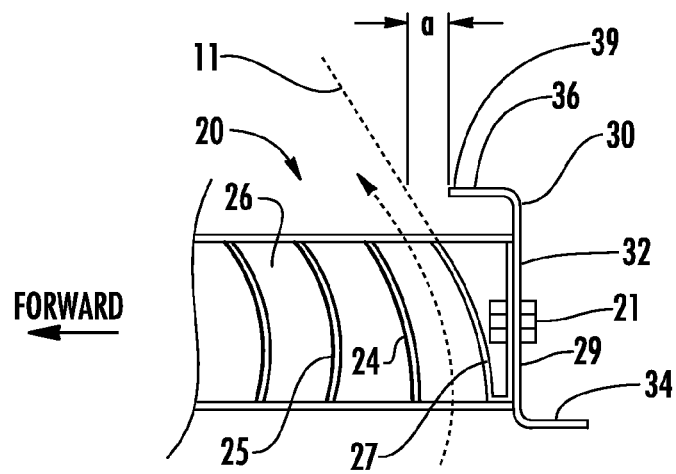
FIG. 1D is a partial cross-sectional view of the prior art cascade-type thrust reverser shown in FIG. 1C showing the aft end of the cascade array and a prior art aft cascade ring.
Figure 1E:
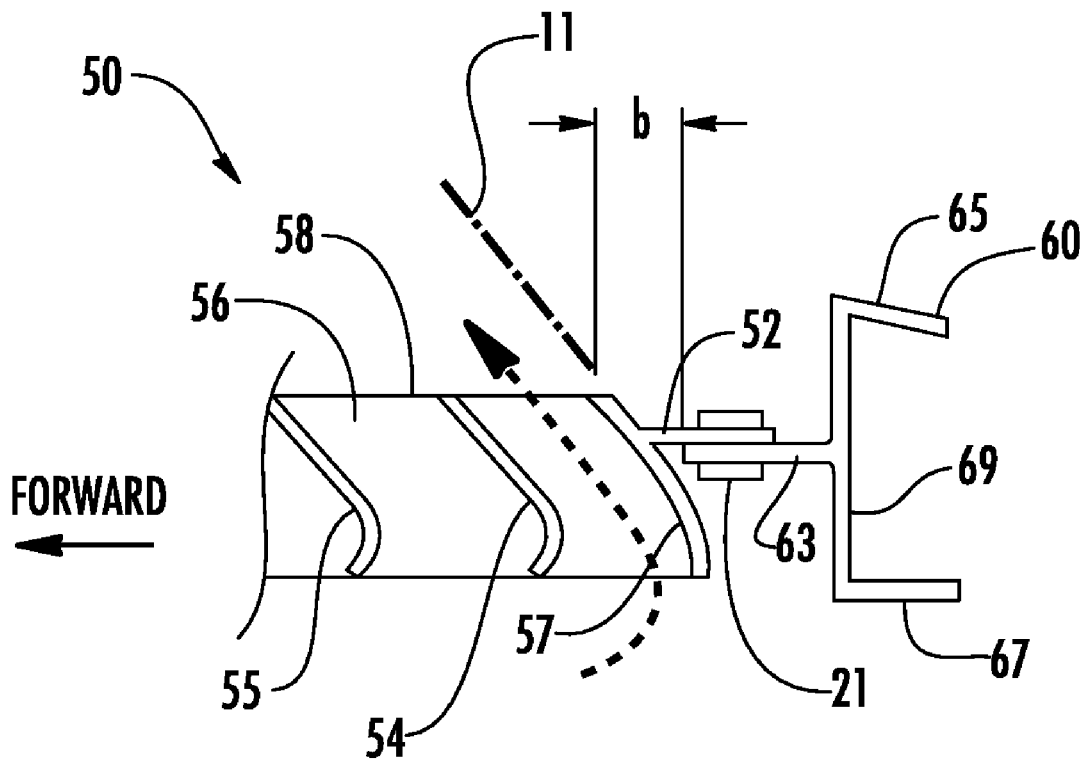
FIG. 1E is a partial cross-sectional view like that of FIG. 1D showing the aft end of cascade array and another type of prior art aft cascade ring.

One embodiment of a thrust reverser 200 including one embodiment of a cascade assembly 100 and one embodiment of an aft cascade ring 120 according to the invention is shown in FIGS. 2A and 2B. As shown in FIGS. 2A and 2B, the thrust reverser 200 includes a translating sleeve 16 movably attached to the aft end of a stationary portion 12 of a nacelle. In FIG. 2A, the translating sleeve 16 is shown in a retracted or stowed position. As also shown in FIG. 2A, when the translating sleeve 16 is in the stowed position, the blocker door(s) 18 is stowed in a position adjacent to the interior surface of the translating sleeve. In FIG. 2B, the translating sleeve 16 is shown in a deployed position. In the deployed position, the blocker door(s) 18 is extended into the fan duct 13 to block fan flow through the duct 13. As also shown in FIG. 2B, deployment of the translating sleeve 16 opens an exit opening 15 in the nacelle structure, and exposes a cascade assembly 100 disposed within the exit opening 15. The cascade assembly 100 includes a plurality of cascade segments 102. Each cascade segment 102 includes a plurality of spaced vanes 105 configured to turn the flow of air exhausted through the exit opening 15 to an at least partially forward direction, including an aft vane 107. A forward end of each cascade segment 102 is removably connected to one or more flanges 14 on the aft end of the stationary portion 12 of the nacelle structure. The forward end of each cascade segment 102 can be connected to the flange or flanges 14 by one or more removable fasteners 23 of a type or types known in the art.

The aft end of each cascade segment 102 can be removably connected to an aft cascade ring 120, such as by one or more removable fasteners 101 of a type or types known in the art. For example, the aft end of each cascade segment 102 can be removably connected to an aft cascade ring 120 by one or more sets of nuts and bolts. The aft cascade ring 120 ties the aft ends of the cascade segments 102 together, adds stiffness to the cascade assembly 100, and restrains the outward deflection of the cascade segments 102 when the cascade segments 102 are exposed to high velocity air flow passing through the exit opening 15. As indicated by the dashed lines in FIG. 2B, the cascade assembly 100 causes air to exit the opening 15 in an exhaust plume having a substantially forward directional component. As also shown in FIG. 2B, the exhaust plume has an aft boundary 11 that is slightly forward of the translating sleeve 16.

Figure 3:
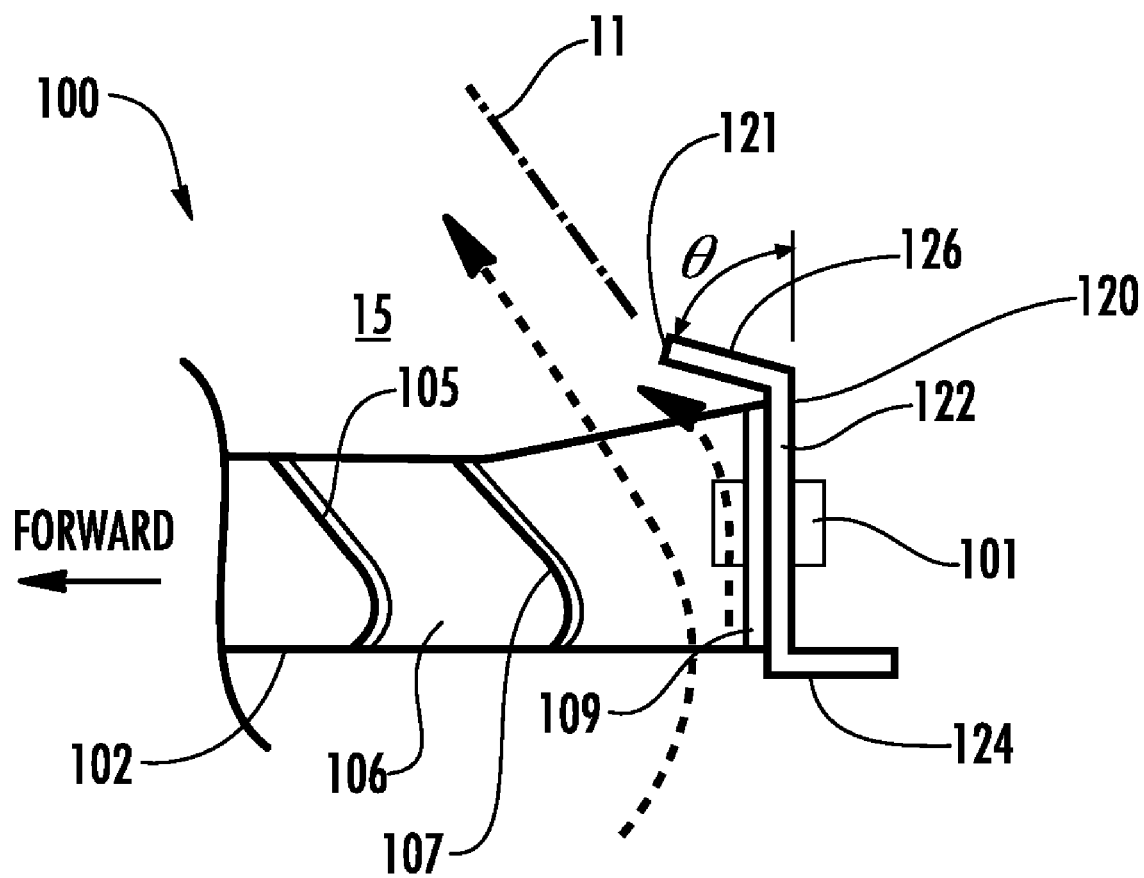
FIG. 3 is a partial cross-sectional view of the aft end of the cascade assembly of the thrust reverser shown in FIGS. 2A and 2B.

FIG. 3 shows an enlarged detail of one configuration of the aft end of the embodiment of the cascade assembly 100 described above. In this embodiment, the aft end of each cascade segment 102 can include an aft flange 109 that is positioned behind the aft-most vane 107. The aft flange 109, vanes 105 and aft-most vane 107 of each cascade segment 102 can be supported and positioned by two or more spaced longitudinal supports 106. By providing substantial space between the aft-most vane 107 and the aft flange 109, exiting fan flow can pass between the aft-most vane 107 and the aft flange 109, as indicated in FIG. 3 by a dashed arrow.

Figures 4, 5:
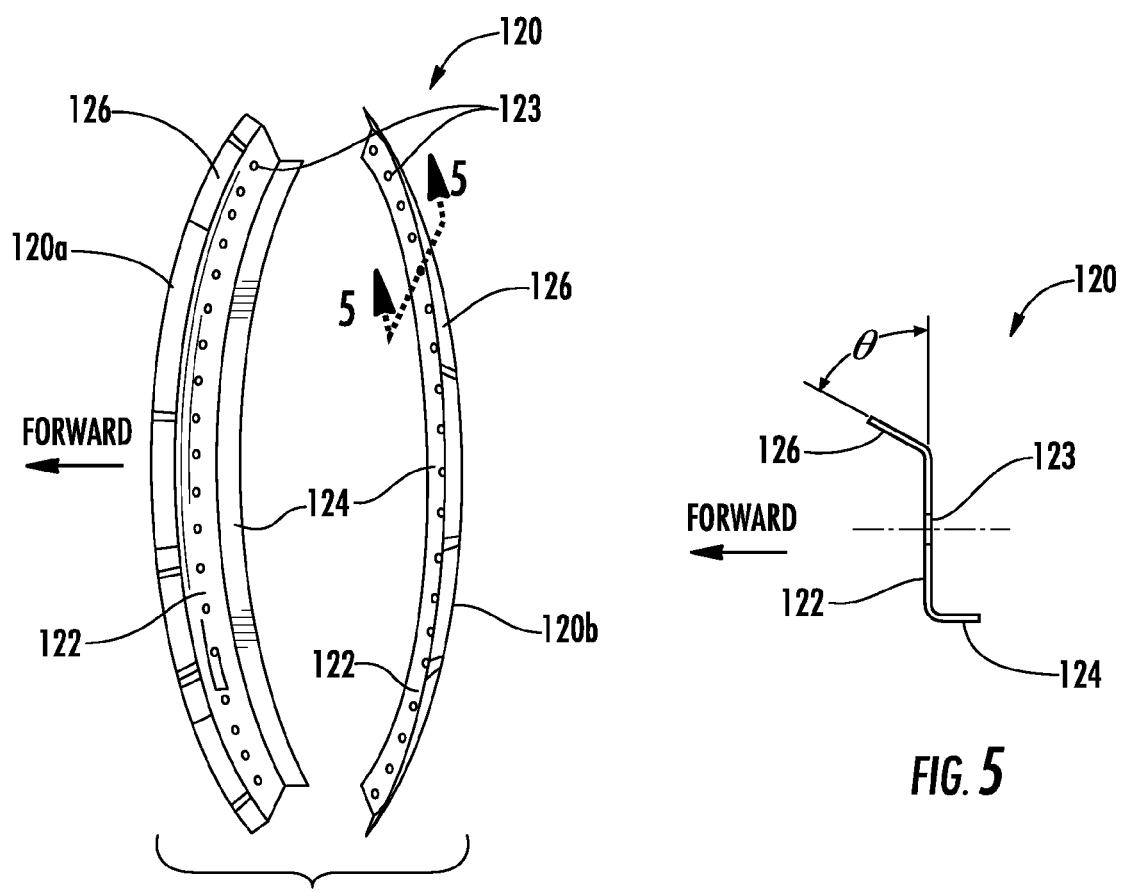
FIG. 4 is a perspective review of one embodiment of an aft cascade ring for use in the thrust reverser and cascade assembly shown in FIGS. 2A-3.
FIG. 5 is a cross-sectional view of the aft cascade ring shown in FIG. 4 taken along line 4-4.

One embodiment of an aft cascade ring 120 for use with a cascade assembly 100 like that described above is shown in FIGS. 4 and 5. As shown in FIG. 4, though the aft cascade ring 120 is referred to herein as a "ring," the aft cascade ring 120 can be constructed in two or more arcuate parts which may or may not combine to form a complete 360-degree ring structure. For example, as shown in FIG. 4, the aft cascade ring 120 can include two arcuate parts 120a, 120b which are mirror images of either. As shown in FIGS. 4 and 5, one embodiment of the cascade ring 100 can include a body portion 122, an outer or "deflector" portion 126, and an inner portion 124. In the embodiment shown in FIGS. 3-5, the body portion 122 is substantially flat, and lies in a plane that is substantially transverse to the longitudinal axis of an associated aircraft engine. As shown in FIG. 4, the body portion 122 can include a plurality of holes or openings 123 for use in removably fastening the ring 120 to the cascade segments 102. In the embodiment shown in FIGS. 3-5, the inner portion 124 of the ring 120 can be substantially cylindrical in shape, and can rearwardly extend from an inner edge of the body portion 122. As shown in FIG. 5, the inner portion 124 can be substantially perpendicular to the body portion 122.

Figure 6:
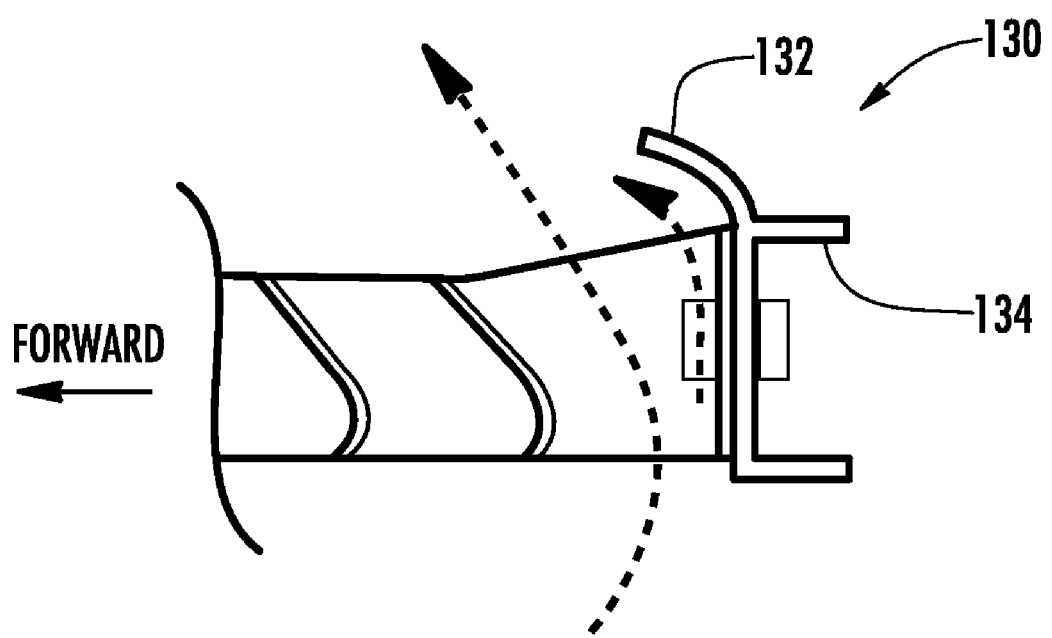
FIG. 6 is a cross-sectional view of another embodiment of an aft cascade ring according to the invention.

As shown in FIGS. 3-5, the deflector portion 126 of one embodiment of the aft cascade ring 120 can generally forwardly extend from the outer edge of the body portion 122. As shown in FIGS. 3 and 5, the deflector portion 126 can extend at an angle "θ" relative to the body portion 122. In the embodiment shown, the angle "θ" between the deflector portion 126 and the body portion 122 is less than 90 degrees. In one embodiment, the angle "θ" is between about 60 degrees and about 90 degrees, though angles less than 60 degrees may also be used. Accordingly, in one embodiment of the aft cascade ring 120, the deflector portion 126 can have a substantially frusto-conical shape having a largest diameter at its forward edge. Alternatively, the deflector portion 126 can have other shapes. For example, as shown in FIG. 6, a deflector portion 132 can have a substantially arcuate shape. As also shown in FIG. 6, an aft cascade ring 130 according to the invention can include additional portions, such as an additional aft portion 134, in order to provide additional strength or stiffness to the ring 130, for example.

In order to minimize the weight of the aft cascade ring 120, 130 the thickness or thicknesses of the body portion 122, the inner portion 124, the outer portion 126, and any other portions 134 can be minimized. In addition, the cross-sectional shape of the ring 120, 130 can be configured to provide adequate stiffness against bending and twisting, while also minimizing weight. The aft cascade ring 120, 130 can be constructed in a single piece, or can be fabricated by joining multiple pieces or sections together. For example, the aft cascade ring 120, 130 can be constructed of composite materials in a single piece using known composite fabrication processes. Alternatively, the aft cascade ring 120 can be constructed of another strong and lightweight material or combination of materials, such as aluminum, titanium, or the like.

In the embodiment shown in FIG. 3, the body portion 122 of the aft cascade ring 120 can be attached to an aft flange 109 of a cascade segment 102 by one or more sets of mechanical fasteners. When so attached, the deflector portion 126 of the aft cascade ring 120 is positioned outboard of the aft flange 109 and vanes 105, 107, and extends forward of the aft flange 109. Accordingly, the deflector portion 126 at least partially extends across an air flow path between the aft flange 109 and the aft-most vane 107. As indicated by the dashed arrows in FIG. 3, as exiting fan flow passes between the aft-most vane 107 and the aft flange 109, the deflector portion 126 at least partially deflects the flow toward an at least partially forward direction. Accordingly, unlike the known cascade rings 30, 60 described above, the aft cascade ring 120 affects the turning of at least some air flow exiting a fan duct through the exit opening 15.

In addition, unlike the known cascade assemblies 20, 50 having cascade rings 30, 60 like those described above, the aft cascade ring 120 does not add substantial length to the cascade assembly 100. Accordingly, by incorporating an aft cascade ring 120, like that described above, the overall weight of a cascade assembly 100 can be substantially reduced as compared to known cascade assemblies.

The embodiments of the invention described above are intended to illustrate various features and aspects of the invention. Persons of ordinary skill in the art will recognize that various changes and modifications can be made to the described embodiments without departing from the invention. For example, though various embodiments of an aft cascade ring have been described as having particular cross sectional shapes and specific portions, an aft cascade ring according to the invention can include various cross sectional shapes and/or portions that are different from the specifically described embodiments. All such changes and modifications are intended to be within the scope of the appended claims.

What is claimed is:

1. An aircraft engine thrust reverser cascade assembly comprising:
    (a) a plurality of circumferentially spaced cascade segments, each cascade segment including a plurality of spaced vanes including an aft-most vane, and an aft end spaced from the aft-most vane so as to define an air flow path between the aft-most vane and aft end through which air passing through the cascade segment flows; and
    (b) an aft cascade ring removably attached to the aft ends of the cascade segments, the aft cascade ring including a body portion oriented in a plane substantially transverse to a longitudinal axis of the cascade assembly, and a deflector portion that at least partially extends forward of the body portion, extending at least partially across the air flow path;
    (c) wherein the deflector portion is configured to at least partially redirect at least a portion of air passing along the air flow.

2. An aircraft engine thrust reverser cascade assembly according to claim 1 wherein the deflector portion has a substantially frusto-conical shape.

3. An aircraft engine thrust reverser cascade assembly according to claim 1 wherein the deflector portion has a substantially arcuate cross-sectional shape.

4. An aircraft engine thrust reverser cascade assembly according to claim 1 wherein the body portion of the aft cascade ring further includes an outer edge and an inner edge, and an inner portion connected to the inner edge, and wherein the deflector portion is connected to the outer edge.

5. An aircraft engine thrust reverser cascade assembly according to claim 1 wherein the deflector portion is non-orthogonal to the body portion.

6. An aircraft engine thrust reverser cascade assembly according to claim 1 wherein the aft cascade ring is removably attached to the aft ends of the cascade segments by a plurality of removable fasteners.

7. An aft cascade ring for an aircraft engine thrust reverser cascade assembly having a plurality of cascade segments, the aft cascade ring comprising:
    (a) a body portion having a major axis, an outer edge and an inner edge, the body portion lying in a plane substantially transverse to a longitudinal axis of the cascade assembly and configured for removable attachment to aft ends of the cascade segments for attaching the aft ends of cascade segments in series; and
    (b) a deflector portion connected to the outer edge of the body portion and extending forward of the body portion and the aft ends of the cascade segments, the deflector portion being configured to redirect at least some reverse thrust exhaust air passing between aft-most vanes and the aft ends of the cascade segments;
    (c) wherein the deflector portion is non-orthogonal with the major axis of the body portion.

8. An aft cascade ring according to claim 7 wherein the deflector portion has a substantially frusta-conical shape.

9. An aft cascade ring according to claim 7 wherein the deflector portion has a substantially arcuate cross-sectional shape.

10. An aft cascade ring according to claim 7 and further comprising at least one aft-extending portion.

11. An aft cascade ring according to claim 10 wherein the aft-extending portion is attached to the inner edge of the body portion.

12. An aft cascade ring according to claim 10 wherein the aftward extending portion has a substantially cylindrical shape.

13. An aircraft engine nacelle with a thrust reverser cascade assembly comprising:
(a) a plurality of circumferentially spaced cascade segments, each cascade segment including an aft-most vane and an aft end; and
(b) an aft cascade ring having a substantially flat body segment adjacent the aft-ends of the cascade segments in a plane substantially transverse to a longitudinal axis of the cascade assembly and adapted to be removably attached to the aft ends of the cascade segments further adapted for attaching the aft-ends of the cascade segments together to form the cascade assembly;
(c) wherein the aft cascade ring includes a deflecting means extending across an air flow oath between the aft-most vanes and aft ends of the cascade segments for redirecting at least a portion of a volume of air passing through the air flow.

14. An aircraft engine nacelle according to claim 13 wherein the deflecting means comprises a deflector portion positioned aft of the aft-most vanes and forward of the aft ends of the cascade segments.

15. An aircraft engine nacelle according to claim 14 wherein the deflector portion of the aft cascade ring has a substantially frusto-conical shape.

16. An aircraft engine nacelle according to claim 14 wherein the deflector portion of the aft cascade ring has a substantially arcuate cross-sectional shape.

17. An aircraft engine nacelle according to claim 13 wherein the body segment of the aft cascade ring comprises an outer edge and an inner edge and an inner segment connected to the inner edge, wherein the deflecting means is a deflector portion connected to the outer edge of the body segment, and wherein the deflector portion extends outward and forward of the outer edge.

18. An aircraft engine nacelle according to claim 17 wherein the deflector portion of the aft cascade ring is non-orthogonal to the body segment.

19. An aircraft engine nacelle according to claim 13 wherein the aft cascade ring is removably attached to the aft ends of the cascade segments by a plurality of removable fasteners.

20. An aircraft engine nacelle according to claim 13 wherein the aft cascade ring comprises two or arcuate ring segments.

* * * * *